March 12, 1963   W. B. SPARKS ETAL   3,081,038
SELF-PROPELLED LAWN SPRINKLER
Filed April 18, 1960
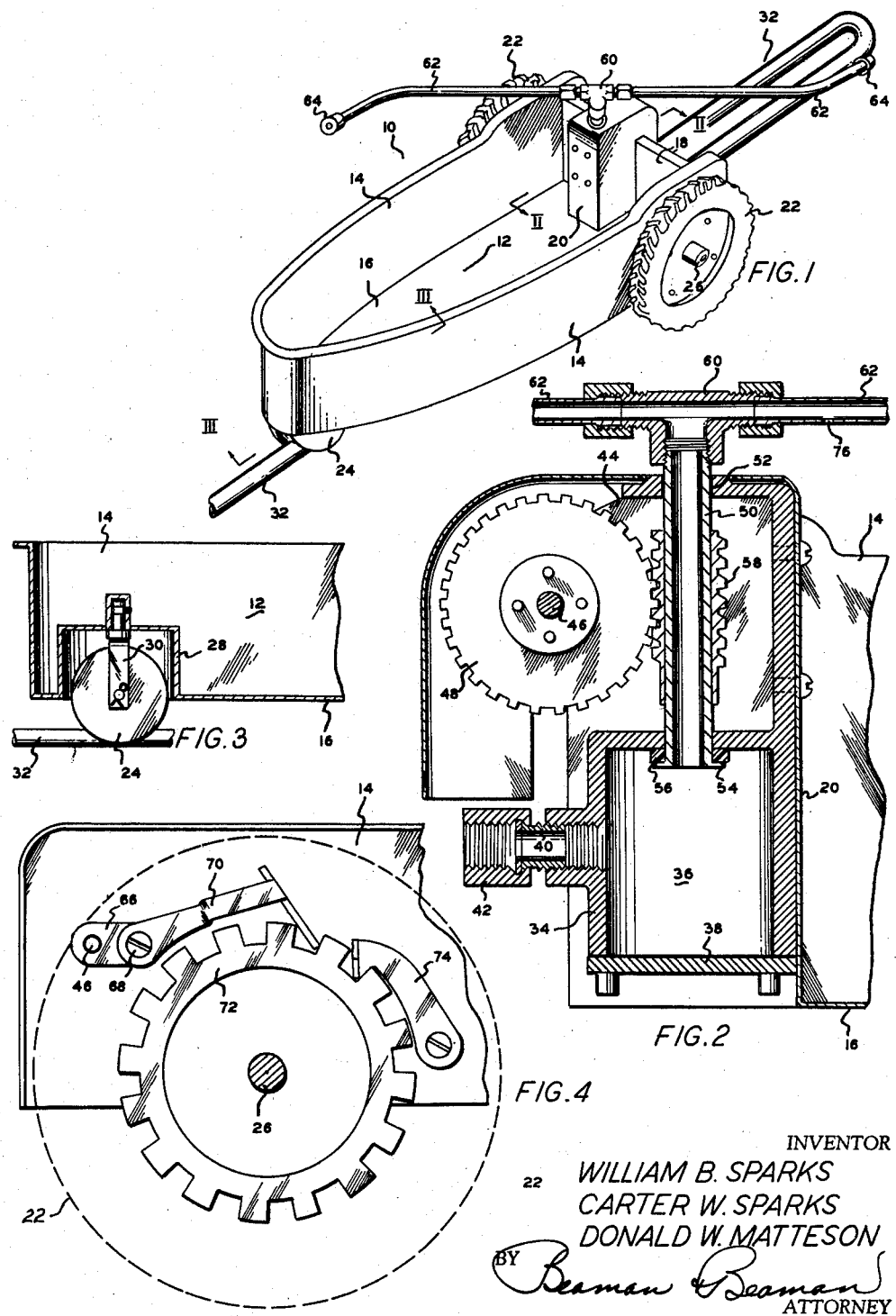
INVENTOR
WILLIAM B. SPARKS
CARTER W. SPARKS
DONALD W. MATTESON
BY Beaman & Beaman
ATTORNEY

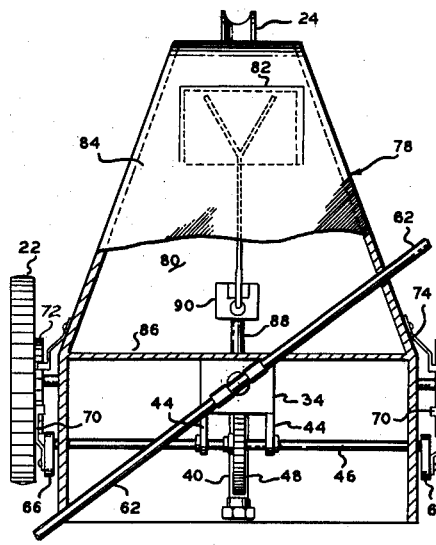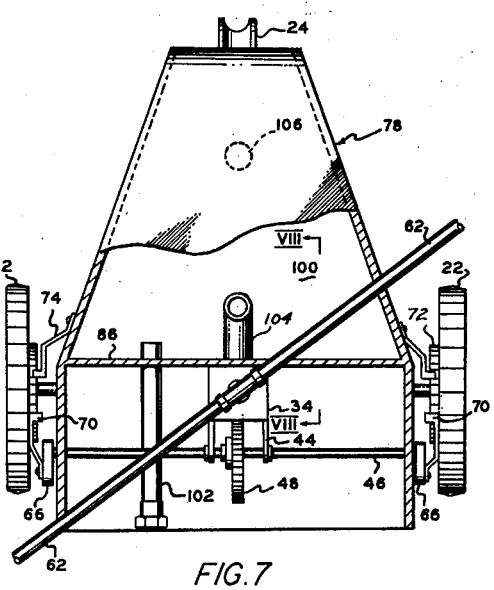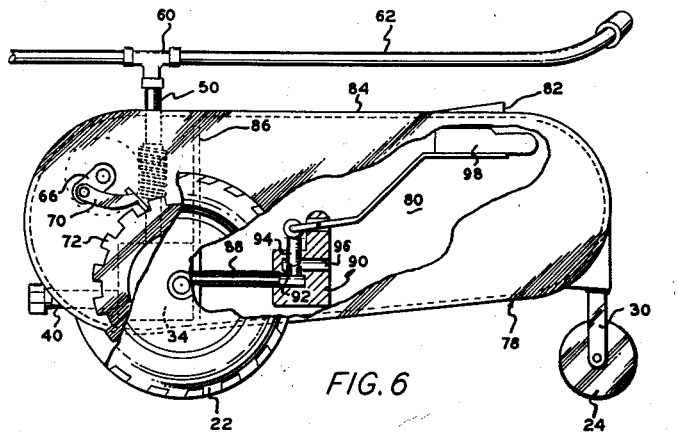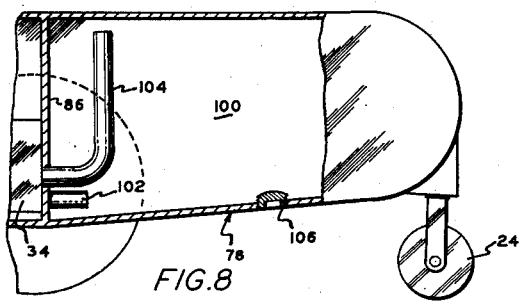

3,081,038
SELF-PROPELLED LAWN SPRINKLER
William B. Sparks, Donald W. Matteson, and Carter W. Sparks, Jackson, Mich., assignors to Casalbi Co., Jackson, Mich., a corporation of Michigan
Filed Apr. 18, 1960, Ser. No. 22,784
7 Claims. (Cl. 239—192)

The invention relates to lawn sprinklers and particularly pertains to a portable lawn sprinkler of the self-propelled type.

In the use of conventional lawn sprinklers, it is necessary to periodically relocate the sprinkler to distribute the water about the lawn and to obtain a complete wetting of the area which may not be possible on locating the sprinkler in a single position. In a lawn of considerable size, it is often necessary to relocate the sprinkler many times and such relocation thereof is obviously bothersome and time consuming. The problem of relocating the sprinkler has been overcome by the use of lawn sprinklers of the traveling type in which the sprinkler is provided with driving means for moving the sprinkler slowly across the ground and thereby wetting a considerable area of lawn without attention from the operator. Such sprinklers usually rely upon the hose as a guide, the sprinkler employing a guide wheel which rides upon the hose and guides the directional travel of the sprinkler. This type of sprinkler has not enjoyed the commercial success that is believed to be indicative of the advance in the lawn sprinkler art made by this type of sprinkler.

One of the reasons for the limited commercial success of the traveling lawn sprinklers is due to the fact that such sprinklers usually lack the traction necessary to pull a hose of considerable length.

In a sprinkler where the hose is employed as a guide it is necessary for the sprinkler, as it moves along the hose, to pull along one-half of the length of the hose over which it has passed and in using a hose of 50 or 100 feet it requires considerable traction to provide the pulling power for the length of hose involved. While shorter hoses do not require the traction of a longer hose, the shorter hose requires fairly close attention on the part of the operator and is undesirable from this aspect.

Heretofore one of the solutions for providing increased traction for the lawn sprinkler was to make the sprinkler of a heavy construction, however, as it is necessary to manually lift and relocate the sprinkler, the heavy construction is objectionable as it renders the handling and storing of the sprinkler difficult. To overcome this problem it is a primary purpose of the invention to provide a traveling lawn sprinkler having a ballast receptacle or tank wherein the weight of the sprinkler may be easily increased during the operation thereof and the ballast removed when it is desired to relocate or store the sprinkler.

It is thus an object of the invention to provide a self-propelled lawn sprinkler having a ballast receptacle formed thereon.

A further object of the invention is to provide a self-propelled lawn sprinkler of simple construction which is attractive in appearance and includes a water ballast receptacle which is filled from the water supply associated with the sprinkler head.

Yet another object of the invention is to provide a self-propelled lawn sprinkler of concise proportions employing a reaction type rotating sprinkler head wherein the sprinkler head is geared to drive a pair of drive wheels and the receptacle is filled with water during the operation of the sprinkler.

Another object of the invention is to provide a self-propelled lawn sprinkler having a water ballast receptacle wherein the receptacle is provided with a valved water inlet which is controlled by the amount of water within the receptacle.

Another object of the invention is to provide a self-propelled lawn sprinkler having a pressurized water ballast receptacle wherein the water supply is introduced into the receptacle and upon the filling of such receptacle, the water may flow into the sprinkler head.

These and other objects of the invention arising from the structural details and relationships of specific embodiments will become apparent from the following descriptions and accompanying drawings wherein:

FIG. 1 is a perspective view of one embodiment of the invention,

FIG. 2 is an elevational sectional view of the motor and drive gear of the embodiment of FIG. 1 taken along the line of II—II thereof, FIG. 3 is an elevational sectional view of the guide wheel arrangement of the embodiment of the FIG. 1 taken along the section III—III thereof, FIG. 4 is an elevational detailed view of a ratchet and pawl drive mechanism employed with the drive wheels of the sprinkler of FIG. 1 wherein the tire has been removed and the ratchet wheel is exposed, FIGS. 5 and 6 are plane and elevational views, respectively, partly in section, of another embodiment of the invention employing a float operated valve and, FIGS. 7 and 8 are plane and elevational views, respectively, partly in section, of yet another embodiment of the invention employing a pressurized water ballast tank.

A basic form of the invention is illustrated in FIGS. 1 through 4, wherein it will be seen that a self-propelled lawn sprinkler in accord with the invention may include a frame, generally indicated at 10, which includes an open top ballast receptacle 12 defined by sides 14 and a bottom 16. The receptacle 12 or tank is preferably made of a sheet material, either metal or a synthetic composition, and comprises the majority of the frame 10. A rear wall 18 encloses the rear end of the ballast receptacle 12 and a sheet metal housing 20 may be formed therein to house the fluid motor as will be later apparent.

The receptacle 12 is watertight and is capable of being filled with water to a depth of the sides 14.

The frame 10 and receptacle 12 are supported upon a pair of drive wheels 22 and a guide wheel 24. The drive wheels 22 are rotatably mounted upon axle shafts 26 which are affixed to the rear portions of the receptacle sides 14 by welding or other suitable means. The guide wheel 24, as best shown in FIG. 3, consists of a pivotably mounted wheel located within a recess 28 defining in the bottom of the receptacle. The wheel 24 is rotatably mounted within a yoke 30 having a vertical axis and the yoke is pivotably mounted to the receptacle. The drive wheel 24 is circumferentially grooved, as will be apparent from FIGS. 5 and 7, and is adapted to ride upon the hose 32 supplying water to the sprinkler head. Thus, as the sprinkler straddles the hose with the guiding wheel riding thereupon, the guide wheel will follow the track made thereby.

A fluid motor is located within the frame housing portion 20 and is illustrated in FIG. 2 in detail. The body of the motor preferably consists of a casting 34 defining a chamber 36 closed by a bottom plate 38, secured in position by screws. An inlet conduit 40 is provided into the chamber 36 and is provided with a hose connection 42 whereby the water supply hose may be affixed in communication with the motor chamber. A pair of arms 44 in spaced relation form a part of the motor casting 34, see FIGS. 5 or 7, and extend rearwardly therefrom. The arms 44 provide support for the drive shaft 46 and a gear wheel 48 is mounted therebetween upon the drive shaft. An upright conduit 50 extends through the upper wall of the chamber 36 and is supported in the upper regions by a bearing surface 52 defined on the motor casting. The conduit 50 is provided at the lower end with a radial flange 54 and a nylon washer 56, which bears against the upper chamber wall, and water pressure within the chamber will continually bias the conduit upwardly insuring a watertight sealing engagement between the nylon washer and the upper chamber wall. A worm screw 58 is concentrically affixed to the conduit 50 wherein the worm screw 58 and gear 48 are in meshing engagement. The upper end of the conduit 50 is threaded and is provided with a T connection 60 to which are mounted the distributor and reaction conduits 62, having nozzles 64 affixed to the ends thereof. It will be noted that the end regions of the conduits 62 are angularly disposed to the general length thereof whereby water emitting from the conduits will rotate the T and conduit 50. Thus, upon the introduction of water into the chamber 36 the pressure of the water will bias the conduit upwardly and the flow of water through the conduits will rotate the sprinkler head structure, including the worm screw 58 to rotate the drive gear 48.

The drive shaft 46 extends laterally across the sprinkler frame adjacent to and behind the rear wall 18 and passes through a bearing located on each of the side walls 14, see FIGS. 5 and 7. A crank member 66 is affixed to each end of the drive shaft 46 and is provided with a pivot screw 68 in spaced relation to the axis of the drive shaft. A pawl 70 is pivotally mounted upon the pivot screw 68 of each crank member whereby rotation of the drive shaft will translate the pawl in a back and forth motion. Preferably, the crank members 66 on each end of the drive shaft are angularly disposed in like manner to the shaft whereby the drive pawls 70 will operate in a simultaneous and equal manner. A ratchet wheel 72, which may be constructed of plastic if desired, is concentrically affixed to the inside of each drive wheel 22 and the drive pawls 70 are in driving connection with the teeth of the ratchet wheels 72. Thus, as the drive shaft 46 rotates upon the sprinkler head mechanism rotating, the drive pawls 70 will simultaneously index the drive wheels forward one ratchet wheel tooth with each revolution of the drive shaft. Due to the relatively slow rotation of the sprinkler head and the gear reduction produced by the worm drive it will be appreciated that the drive shaft rotates quite slowly and the sprinkler will slowly move forward. To insure that the sprinkler always moves in a forward direction, even though traveling uphill, gravity biased pawls 74 are associated with each of the ratchet wheels 72 and are pivotably mounted upon the sides 14 to insure an even unidirectional movement of the ratchet wheel.

The above described drive mechanism for the drive wheels of the sprinkler insures that the drive wheels will not tend to drive the sprinkler in a straight line when the guide wheel is attempting to follow a relative sharp curve in the hose track. For instance, in the travel of the sprinkler around a relatively sharp corner the inside drive wheel need not rotate as far as the outside drive wheel and by independently driving each of the wheels by the disclosed structure the drive can compensate somewhat for this difference in rotation required by the drive wheels without tending to "derail" the guide wheel 24 as the outside wheel will rotate a distance greater than one ratchet tooth index as the inside drive wheel is indexed. Thus, a differential action is produced and the guide wheel will remain on the hose and the sprinkler is permitted to follow the hose even though relatively sharp turns occur therein.

One of the reaction conduits 62 is provided with an orifice 76 in the lower portion thereof whereby a continuous stream of water will flow therefrom in a downward direction. The orifice 76, FIG. 2, is located close to the T 60 wherein the water emitting therefrom will flow into the receptacle 12 as the sprinkler head rotates. Thus, while there would be no water in the tank during the initial operation of the sprinkler the receptacle will soon fill with the water flowing from the orifice 76 and eventually flow over the sides 14 of the receptacle. The weight of the water within the receptacle will be approximately 25 pounds and has proven to be adequate to provide sufficient traction for the drive wheels under conventional terrain conditions while pulling considerable lengths of hose therebehind. It will be appreciated that at the beginning of the operation the sprinkler will be located at the most removed point from the hydrant and only a few feet of hose will be pulled during the initial travel of the sprinkler and, hence, the traction requirements are a minimum. During these initial moments of the sprinkler operation the weight of the sprinkler alone provides sufficient traction to pull the hose without requiring the added weight of the ballast. As the traction requirements increase the water depth will be increasing within the receptacle and the maximum depth of water will be reached before the maximum traction requirements are needed and, hence, although several minutes may be needed to fill the receptacle this time lapse will not affect the operation of the sprinkler.

When it is desired to move the sprinkler, the operator will shut off the water and tilt the sprinkler to remove the water from the receptacle. Thereupon the sprinkler may be carried about as desired and the hose may be laid out to water a different section of lawn. The sprinkler is placed to straddle the hose and located adjacent the remote end thereof whereby upon the supply of water pressure being fed into the sprinkler head the sprinkler will repeat the cycle and once again fill the receptacle during the sprinkler travel.

Another embodiment of the invention appears in FIGS. 5 and 6. In this embodiment the frame is designated by the numeral 78 and is of sheet metal configuration. The front portion of the frame comprises a receptacle or tank 80 which is entirely enclosed except for a drain vent 82 defined in the upper surface thereof. The vent 82 may be formed by slitting and deforming a portion of the upper receptacle cover 84. The rear wall of the receptacle 80 is shown at 86 and the rear portion of the receptacle cover 84 extends rearwardly and is formed in an arc to enclose the motor and drive structure. It will thus be appreciated that the embodiment of the invention disclosed in FIGS. 5 and 6 is of a very clean and attractive appearance.

The frame 78 is mounted upon a pair of drive wheels 22 and a guide wheel 24 in a manner identical to that of the embodiment of FIG. 1 and like components to that embodiment are identified by like reference numerals. The drive motor is identical to that of the embodiment of FIG. 1 and is attached to the rear wall 86 as shown in FIG. 6. The hose connection 42 permits water to be supplied to the motor whereupon the upright conduit 50 and the conduits 62 will rotate to subsequently rotate the drive shaft 46. The drive mechanism of the embodiment of FIGS. 5 and 6 is identical to that of FIG. 1 and as the drive shaft 46 rotates, the drive wheels 22 will be indexed to move the sprinkler in a forward direction. A conduit 88 extending through the rear wall 86 communicates with the interior of the motor chamber 36 and supplies the water to the ballast receptacle 80. A valve 90 is affixed to the conduit 88 and controls the flow of fluid therethrough. The valve 90 consists of a valve seat 92 in communication with the conduit 88 and a plunger 94, having a surface selectively sealingly engaging the valve seat, may reciprocate in a vertical direction to permit water to flow from the valve via bore 96. A float 98 is pivotally connected to the valve and the vertical movement of the float controls the position of the plunger to control the flow of water through the valve.

In the operation of the embodiment of FIGS. 5 and 6 the introduction of pressurized water into the fluid motor will start the sprinkler head structure rotating and drive the sprinkler in a forward direction as described. Assuming the ballast receptacle 80 to be empty, the float will permit a portion of the water within the motor chamber to flow into the receptacle until the float is raised to the level which will close the valve 90. It will thus be appreciated that the receptacle will be substantially filled with water ballast during the early stages of the operation of the sprinkler whereupon the water ceases to flow into the receptacle and all of the water being supplied to the sprinkler will flow from the sprinkler head. When it is desired to empty the receptacle the sprinkler will be tipped or inverted that the water within the receptacle will flow from the drain opening 82. The drain opening 82 may take many different forms and the invention is not intended to be limited to the disclosed opening configuration.

Another embodiment of the invention is shown in FIGS. 7 and 8 and elements similar to those employed in the embodiment of FIGS. 1 through 4 are indicated with like reference numerals. In the embodiment of FIGS. 7 and 8 the basic structure is similar to that of FIGS. 5 and 6, however, the receptacle 100 is of a closed or pressurized type and is not provided with an open drain opening. The receptacle 100 is of sufficient strength to withstand pressures encountered in conventional water systems and is supplied with water from the conduit 102 to which the hose is connected. The conduit 102 extends through the rear wall 86' of the receptacle and permits the pressurized water to flow into the same. The fluid motor casting 34 is affixed to the rear wall of the receptacle and an inlet conduit 104 which extends into the receptacle 100 and is directed upwardly to terminate near the upper regions of the receptacle establishes communication between the chamber 36 and the receptacle. A drain plug 106 is provided in the lower surface of the receptacle for removing the water therefrom.

In the operation of the embodiment of FIGS. 7 and 8 the hose is connected to conduit 102 and the introduction of water into the receptacle 100 will cause the water level in the receptacle to rise and force the air therein through the motor inlet conduit 104 and into the atmosphere through the sprinkler head. As the water level continues to rise, it will eventually reach a depth sufficient to cause the water to flow into the fluid motor and, hence, start the rotation of the sprinkler head and the distribution of water. In this embodiment the receptacle 100 must be entirely filled before the sprinkler will begin operation and the need for a valve is eliminated. By locating the inlet of the fluid motor inlet conduit 104 adjacent the upper regions of the receptacle most of the air will be removed from the receptacle and a full receptacle of water is assured. When it is desired to drain the water from the receptacle 100, removal of the plug achieves this purpose.

It will thus be appreciated that the invention discloses a self-propelled water sprinkler which may be constructed of relatively concise dimensions yet by the use of a water ballast receptacle, permits considerable traction to be achieved in a relatively lightweight device. It is appreciated that various embodiments of the invention, other than those described in the illustrations, may be apparent to those skilled in the art and it is intended that the spirit and scope of the invention be defined only by the following claims.

We claim:

1. A self-propelled lawn sprinkler comprising, in combination, a frame including water ballast means adapted to receive and maintain a predetermined amount of water for ballast purposes and adapted to permit the water ballast to be removed therefrom, wheels supporting said frame, a reaction type rotatable lawn sprinkler head mounted upon said frame adapted to communicate with a source of water, a drive shaft rotatably supported in said frame drivenly associated with said sprinkler head, means drivingly connecting said drive shaft to at least one of said wheels and means communicating with the water source supplying said sprinkler head introducing water into said water ballast mean for ballast purposes.

2. A self-propelled lawn sprinkler comprising, in combination, a frame including water ballast means adapted to receive and maintain a predetermined amount of water for ballast purposes and adapted to permit the water ballast to be removed therefrom, drain means communicating with said water ballast means, wheels supporting said frame, motor means mounted on said frame drivingly associated with at least one of said wheels, a sprinkler head mounted on said frame adapted to communicate with a source of water, conduit means communicating with the water source supplying said sprinkler head introducing water into said water ballast means, a valve controlling the flow of water through said conduit means and operating means associated with said valve controlling said valve in response to the amount of water within said water ballast means thereby regulating the total weight of the ballast.

3. In a self-propelled lawn sprinkler as in claim 2 wherein said valve operating means comprises a valve actuating lever and a float within said water ballast means affixed to said lever.

4. A self-propelled lawn sprinkler comprising, in combination, a frame including a closed water ballast receptacle, drain means defined in said receptacles, wheels supporting said frame, motor means mounted on said frame drivingly associated with at least one of said wheels, a sprinkler head mounted on said frame, means introducing a source of water into said receptacle and conduit means interconnecting said receptacle with said sprinkler head having an inlet disposed adjacent the upper portion of said receptacle whereby upon water substantially filling said receptacle the water will pass from said receptacle into said head.

5. A self-propelled lawn sprinkler comprising, in combination, a frame including water ballast means adapted to receive and maintain a predetermined amount of water for ballast purposes and adapted to permit the water ballast to be removed therefrom, a pair of drive wheels and a guide wheel rotatably supported on said frame, the axes of said wheels being positioned adjacent said water ballast means, a rear wall defining a portion of said water ballast means, a vertically disposed tubular shaft rotatably mounted upon said frame adjacent said rear wall having a reaction-type sprinkler head affixed to the upper end thereof and a pressurized water source communicating with said shaft, drive means operatively interconnecting said shaft with said drive wheels whereby rotation of said shaft due to water flow through said head rotates said drive wheels and means communicating with the water source introducing water into said water ballast means.

6. In a self-propelled sprinkler as in claim 5, wherein a chamber is defined on said frame adjacent said rear wall, said shaft having a lower end rotatably communicating with said chamber, said pressurized water source communicating with said chamber, a conduit communicating with said chamber extending through said rear wall into said water ballast means, a valve controlling water flow through said conduit located within said water ballast means and a float within said water ballast means sensing the amount of wtaer therein operatively associated with said valve controlling the operation thereof.

7. A self-propelled lawn sprinkler comprising, in combination, a frame including a water ballast receptacle adapted to receive and maintain a predetermined amount of water for ballast purposes, said receptacle having an open top, a pair of drive wheels and a guide wheel supporting said frame, a fluid conduit rotatably mounted on said frame, a source of water communicating with one end of said conduit, a reaction type sprinkler head affixed to the other end of said conduit above said receptacle, a worm gear concentrically mounted upon said conduit, a drive shaft rotatably mounted on said frame, a gear substantially centrally located on said drive shaft with respect to the ends thereof and affixed thereto in mesh with said worm gear, a crank affixed to each end of said drive shaft, a ratchet wheel drivingly connected to each of said drive wheels, a pawl pivotally connected to each of said cranks and operatively associated with one of said ratchet wheels, and an orifice defined in said sprinkler head opening downwardly toward said receptacle whereby water flowing from said orifice fills said receptacle.

References Cited in the file of this patent

UNITED STATES PATENTS

| | | |
|---|---|---|
| 2,152,425 | Wilson | Mar. 28, 1939 |
| 2,563,519 | Egly et al. | Aug. 7, 1951 |
| 2,883,116 | Muench | Apr. 21, 1959 |
| 2,945,627 | McDermott | July 19, 1960 |

FOREIGN PATENTS

| | | |
|---|---|---|
| 1,046,300 | France | Dec. 4, 1953 |